US012652406B2

(12) United States Patent
Wang et al.

(10) Patent No.: US 12,652,406 B2
(45) Date of Patent: Jun. 9, 2026

(54) SIGNALING OF LOSSLESS CODING IN VIDEO CODING

(71) Applicant: BEIJING DAJIA INTERNET INFORMATION TECHNOLOGY CO., LTD., Beijing (CN)

(72) Inventors: Xianglin Wang, Beijing (CN); Yi-Wen Chen, Beijing (CN); Xiaoyu Xiu, Beijing (CN); Tsung-Chuan Ma, Beijing (CN); Hong-Jheng Jhu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 32 days.

(21) Appl. No.: 18/737,417

(22) Filed: Jun. 7, 2024

(65) Prior Publication Data

US 2024/0333951 A1 Oct. 3, 2024

Related U.S. Application Data

(60) Division of application No. 17/473,724, filed on Sep. 13, 2021, now Pat. No. 12,041,253, which is a
(Continued)

(51) Int. Cl.
*H04N 19/44* (2014.01)
*H04N 19/169* (2014.01)
(Continued)

(52) U.S. Cl.
CPC ........... *H04N 19/44* (2014.11); *H04N 19/176* (2014.11); *H04N 19/188* (2014.11); *H04N 19/1883* (2014.11); *H04N 19/70* (2014.11)

(58) Field of Classification Search
CPC .... H04N 19/44; H04N 19/176; H04N 19/188; H04N 19/1883; H04N 19/70; H04N 19/157; H04N 19/119
(Continued)

(56) References Cited

U.S. PATENT DOCUMENTS 9,113,167 B2 * 8/2015 Wiegand ................ H04N 19/61
9,161,046 B2 * 10/2015 Van der Auwera .... H04N 19/14
(Continued)

FOREIGN PATENT DOCUMENTS

EP 2991355 A1 3/2016
WO WO 2013/153226 A2 10/2013
WO WO 2013/153226 A3 10/2013

OTHER PUBLICATIONS

Beijing Dajia Internet Information Technology Co. Ltd. et al., International Search Report and Written Opinion, PCT/US2020/022616, Jul. 6, 2020, 9 pgs.
(Continued)

*Primary Examiner* — Tung T Vo
(74) *Attorney, Agent, or Firm* — Oblon, McClelland, Maier & Neustadt, L.L.P.

(57) ABSTRACT

A computing device performs a method of decoding video data by receiving a bitstream corresponding to video data encoding one or more pictures, wherein the one or more pictures are recursively partitioned into a plurality of groups at different partition levels; determining a first syntax element that corresponds to a first group of the plurality of groups; in accordance with a determination that the first syntax element has a first value: decoding the first group in a first mode and in accordance with a determination that the first syntax element has a second value: determining a respective second syntax element for each of one or more second groups within the first groups, wherein the one or more second groups are at a second partition level below the
(Continued)

first partition level and decoding each of the one or more second groups in accordance with a value of the respective second syntax element.

19 Claims, 11 Drawing Sheets

Related U.S. Application Data continuation of application No. PCT/US2020/022616, filed on Mar. 13, 2020.

(60) Provisional application No. 62/819,293, filed on Mar. 15, 2019.

(51) Int. Cl.
  *H04N 19/176* (2014.01)
  *H04N 19/70* (2014.01)

(58) Field of Classification Search
  USPC ..................................................... 375/240.25
  See application file for complete search history.

(56) References Cited

U.S. PATENT DOCUMENTS

| | | | |
|---|---|---|---|
| 9,912,966 | B2 | 3/2018 | Hannuksela |
| 9,948,933 | B2 * | 4/2018 | Zhang .................. H04N 19/134 |
| 10,116,933 | B2 | 10/2018 | Hsiang |
| 10,334,260 | B2 * | 6/2019 | Hannuksela ............ G06F 9/328 |
| 10,356,432 | B2 | 7/2019 | Seregin et al. |
| 2013/0077684 | A1 * | 3/2013 | Chen .................... H04N 19/503 |
| | | | 375/E7.243 |
| 2013/0077696 | A1 | 3/2013 | Zhou |
| 2013/0101035 | A1 | 4/2013 | Wang et al. |

| | | | |
|---|---|---|---|
| 2013/0107950 | A1 * | 5/2013 | Guo ...................... H04N 19/122 |
| | | | 375/E7.243 |
| 2013/0107952 | A1 * | 5/2013 | Coban .................. H04N 19/174 |
| | | | 375/E7.243 |
| 2013/0114693 | A1 * | 5/2013 | Gao ...................... H04N 19/182 |
| | | | 375/240.03 |
| 2013/0114735 | A1 | 5/2013 | Wang |
| 2013/0336395 | A1 * | 12/2013 | Joshi ...................... H04N 19/82 |
| | | | 375/240.12 |
| 2014/0022343 | A1 | 1/2014 | Chen |
| 2015/0264399 | A1 * | 9/2015 | Lin ...................... H04N 19/119 |
| | | | 375/240.12 |
| 2015/0319448 | A1 | 11/2015 | Ramasubramonian et al. |
| 2016/0165209 | A1 * | 6/2016 | Huang ................. H04N 19/597 |
| | | | 348/43 |
| 2016/0198154 | A1 * | 7/2016 | Hsiang ................... H04N 19/70 |
| | | | 375/240.03 |
| 2016/0212446 | A1 * | 7/2016 | Liu ...................... H04N 19/174 |
| 2016/0227217 | A1 * | 8/2016 | Karczewicz ......... H04N 19/593 |
| 2016/0316200 | A1 * | 10/2016 | Zhang .................. H04N 19/107 |
| 2016/0360235 | A1 * | 12/2016 | Ramasubramonian ...................... |
| | | | H04N 19/587 |
| 2017/0150186 | A1 * | 5/2017 | Zhang .................. H04N 19/124 |
| 2017/0180737 | A1 | 6/2017 | Ye et al. |
| 2017/0208336 | A1 * | 7/2017 | Li ......................... H04N 19/172 |
| 2017/0347109 | A1 | 11/2017 | Hendry et al. |
| 2018/0020241 | A1 * | 1/2018 | Li .......................... H04N 19/13 |
| 2019/0110064 | A1 * | 4/2019 | Zhang .................. H04N 19/184 |
| 2025/0056039 | A1 * | 2/2025 | Chujoh ................. H04N 19/70 |

OTHER PUBLICATIONS

Yong He et al., AHG12: On Rectangular Tile Group, Joint Video Experts Team (JVET) of ITU-T SG 16 WP 3 and ISO/IEC JTC 1/SC 29/WG 11, Document: JVETM0121r1, 13th Meeting: Marrakech, MA, Jan. 9-18, 2019, 10 pgs.

* cited by examiner

<u>700</u>

Receiving a bitstream corresponding to video data encoding one or more pictures <u>710</u>

The picture is recursively partitioned into a plurality of groups at different partition levelsl <u>720</u>

Determining a first syntax element that corresponds to a first group of the plurality of groups <u>730</u>

The first group is at a first partition level <u>740</u>

In accordance with a determination that the first syntax element has a first value <u>750</u>

Decoding the first group in a first mode <u>760</u>

In accordance with a determination that the first syntax element has a second value <u>770</u>

Determining a respective second syntax element for each of one or more second groups within the first group <u>780</u>

The one or more second groups are at a second partition level below the first partition level <u>790</u>

Decoding each of the one or more second groups in accordance with a value of the respective second syntax element <u>795</u>

FIG. 7

SIGNALING OF LOSSLESS CODING IN VIDEO CODING

CROSS-REFERENCE TO RELATED APPLICATION

This document is a division application and is based upon and claims the benefit of priority under 35 U.S.C. § 120 from pending application U.S. Ser. No. 17/473,724, filed Sep. 13, 2021, which claims the benefit of PCT application No. PCT/US2020/022616, entitled "SIGNALING OF LOSS-LESS CODING IN VIDEO CODING" filed Mar. 13, 2020, which claims the benefit of U.S. Provisional Application No. 62/819,293, entitled "SIGNALING OF LOSSLESS COD-ING IN VIDEO CODING" filed on Mar. 15, 2019, the entire disclosure of both of which is incorporated herein by reference.

TECHNICAL FIELD

The present application generally relates to video data encoding and decoding, and in particular, to systems and methods of residual coding using multi-model linear model.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighbor blocks within the same video frame. Video blocks in an inter coded (P or B) slice of a video frame may use spatial prediction with respect to reference samples in neighbor blocks within the same video frame or temporal prediction with respect to reference samples in other previous and/or future reference video frames.

Spatial or temporal prediction based on a reference block that has been previously encoded, e.g., a neighbor block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wire-lessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition to 4K×2K or even 8K×4K, the amount of video data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to system and method of improving the process for coding transform coefficients during video coding.

According to a first aspect of the present application, a method of decoding video data is performed at a computing device having one or more processors and memory storing a plurality of programs to be executed by the one or more processors. A computing device performs a method of receiving a bitstream corresponding to video data encoding one or more pictures, wherein the one or more pictures are recursively partitioned into a plurality of groups at different partition levels; determining a first syntax element that corresponds to a first group of the plurality of groups; in accordance with a determination that the first syntax element has a first value: decoding the first unit in a first mode; and in accordance with a determination that the first syntax element has a second value: determining a respective second syntax element for each of one or more second groups within the first group, wherein the one or more second groups are at a second partition level below the first partition level; and decoding each of the one or more second groups in accordance with a value of the respective second syntax element.

According to a second aspect of the present application, a computing device includes one or more processors, memory and a plurality of programs stored in the memory. The programs, when executed by the one or more processors, cause the computing device to perform operations as described above.

According to a third aspect of the present application, a non-transitory computer-readable storage medium stores a plurality of programs for execution by a computing device having one or more processors. The programs, when executed by the one or more processors, cause the computing device to perform operations as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

FIG. 7 is a flowchart illustrating an exemplary process by which a video coder implements the techniques of enabling lossless coding in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
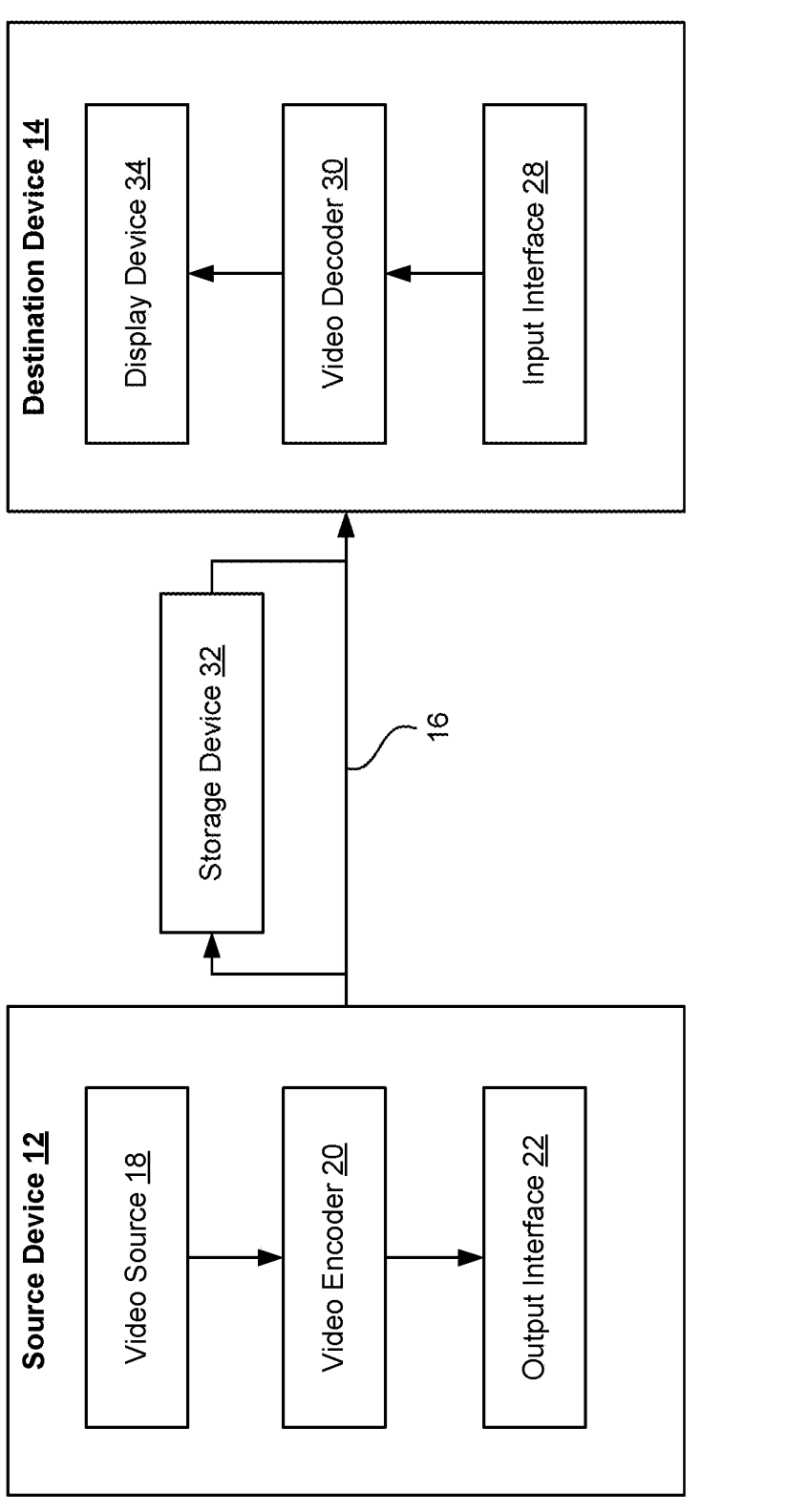
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smartphones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12.

Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored in a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
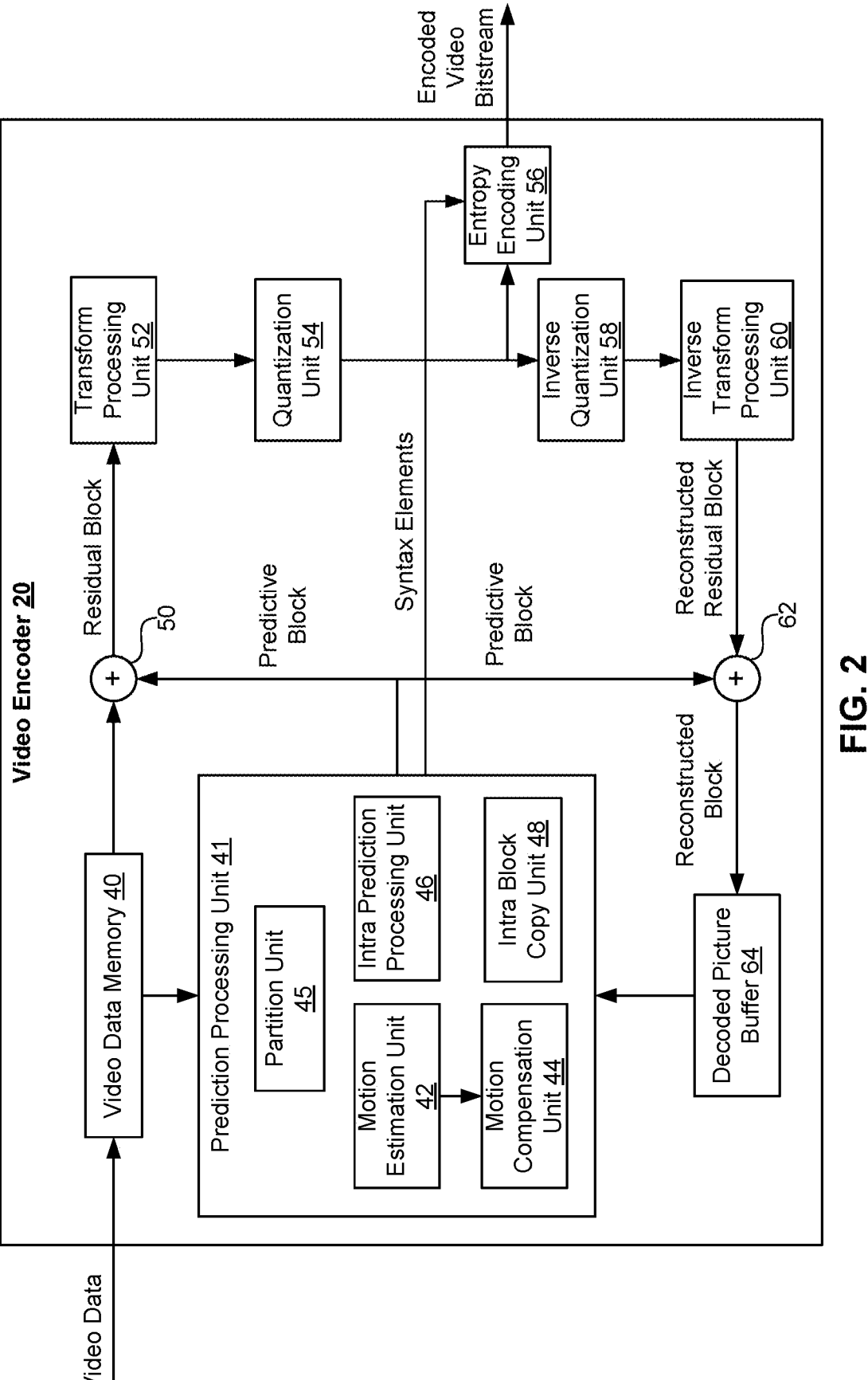
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighbor blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual video block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
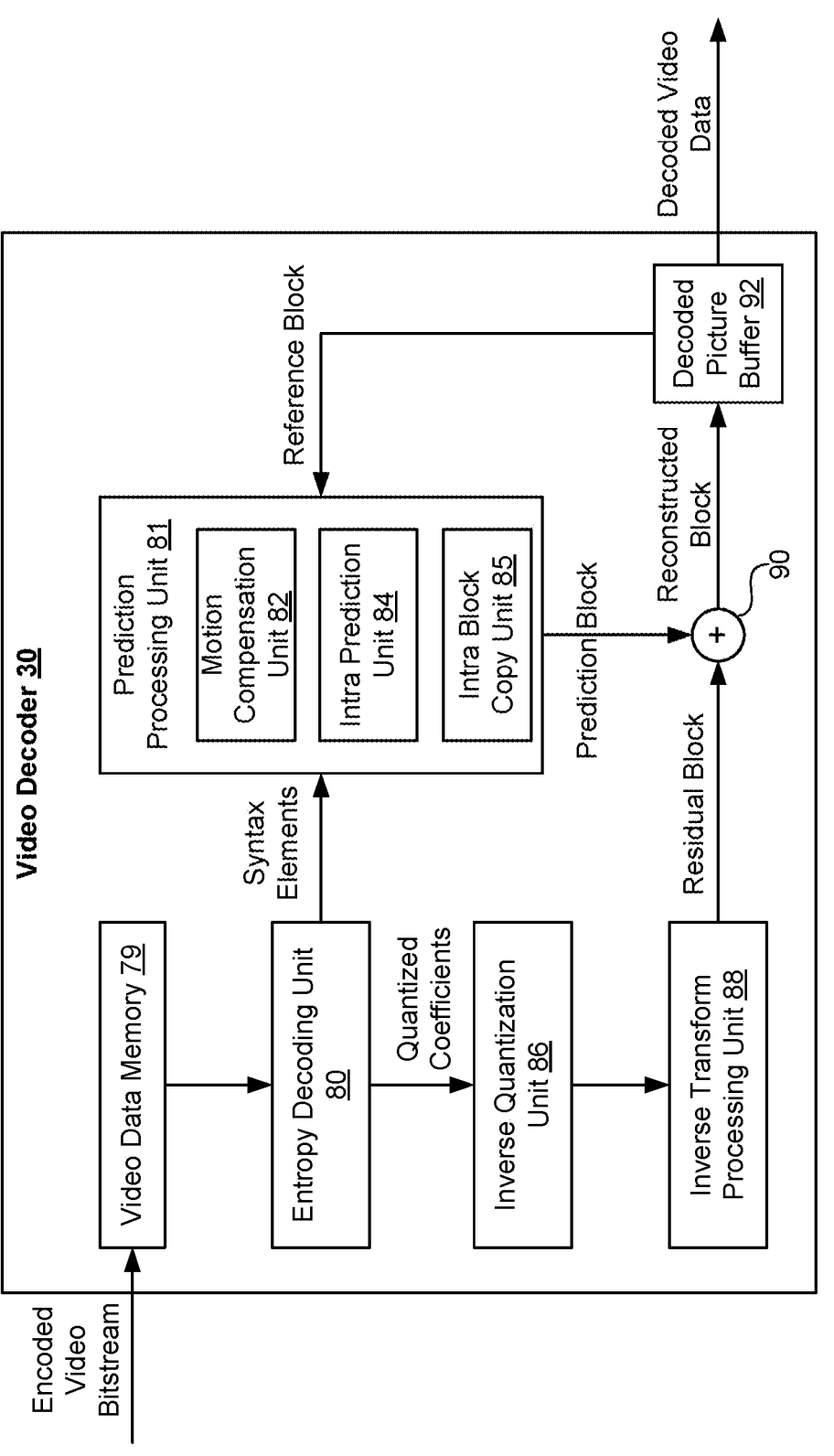
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80.

The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
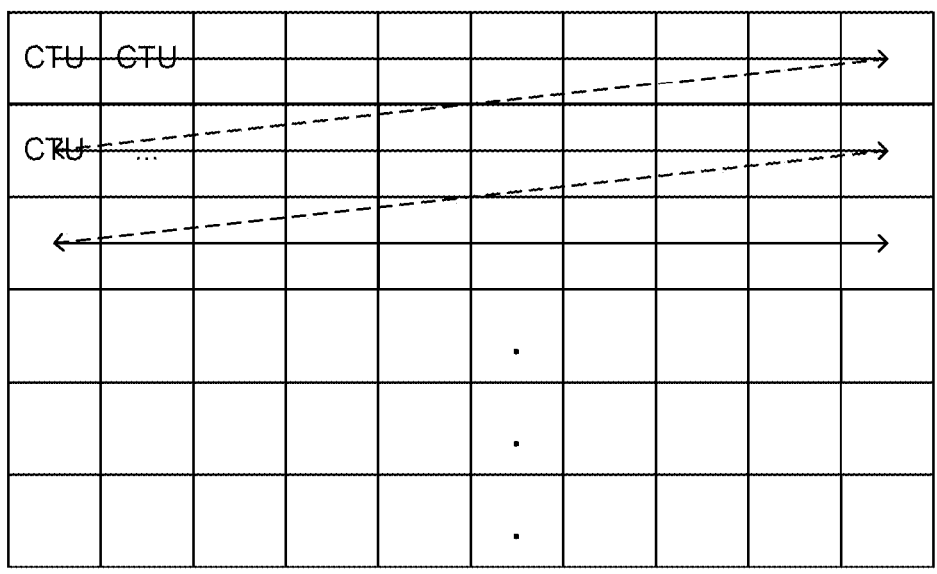
FIGS. 4A, 4B, 4C and 4D are block diagrams illustrating how a frame is recursively quad-tree partitioned into multiple video blocks of different sizes in accordance with some implementations of the present disclosure.
Figure 4B:
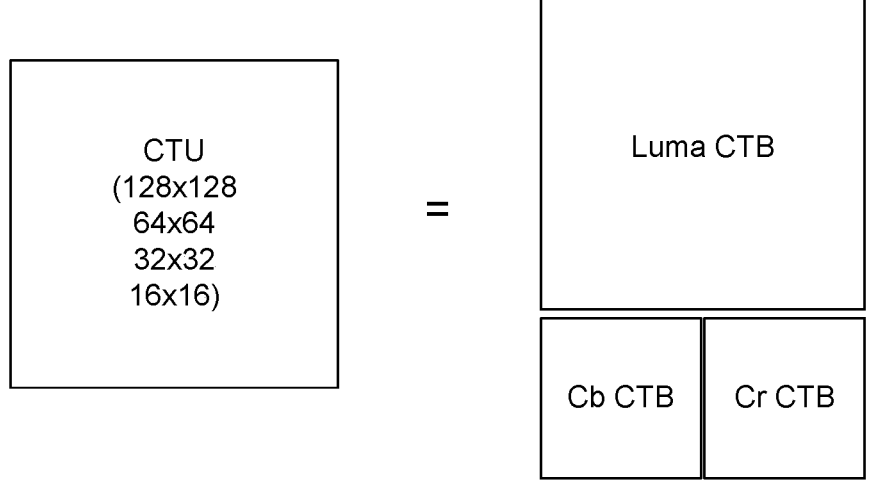

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
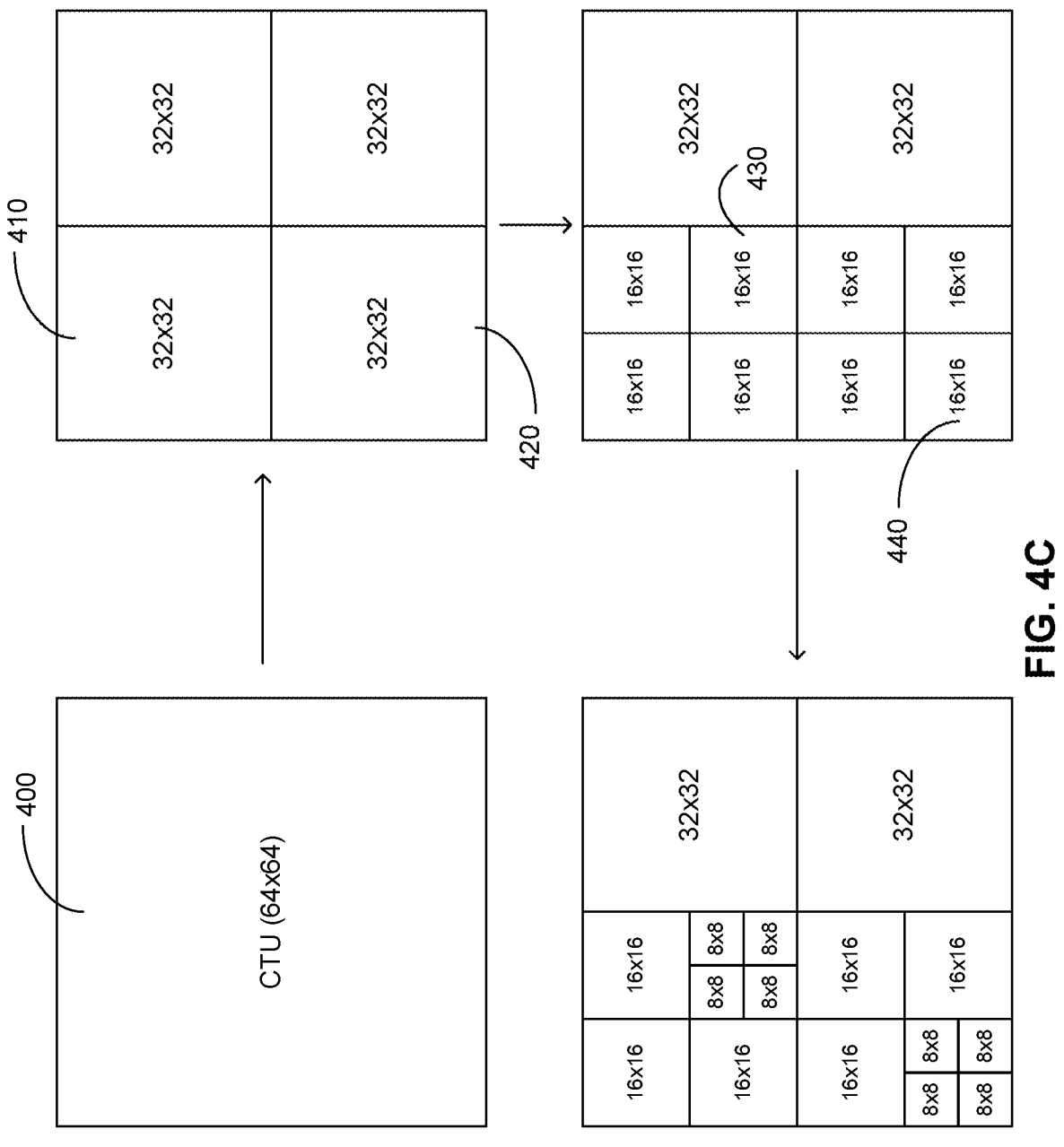
Figure 4D:
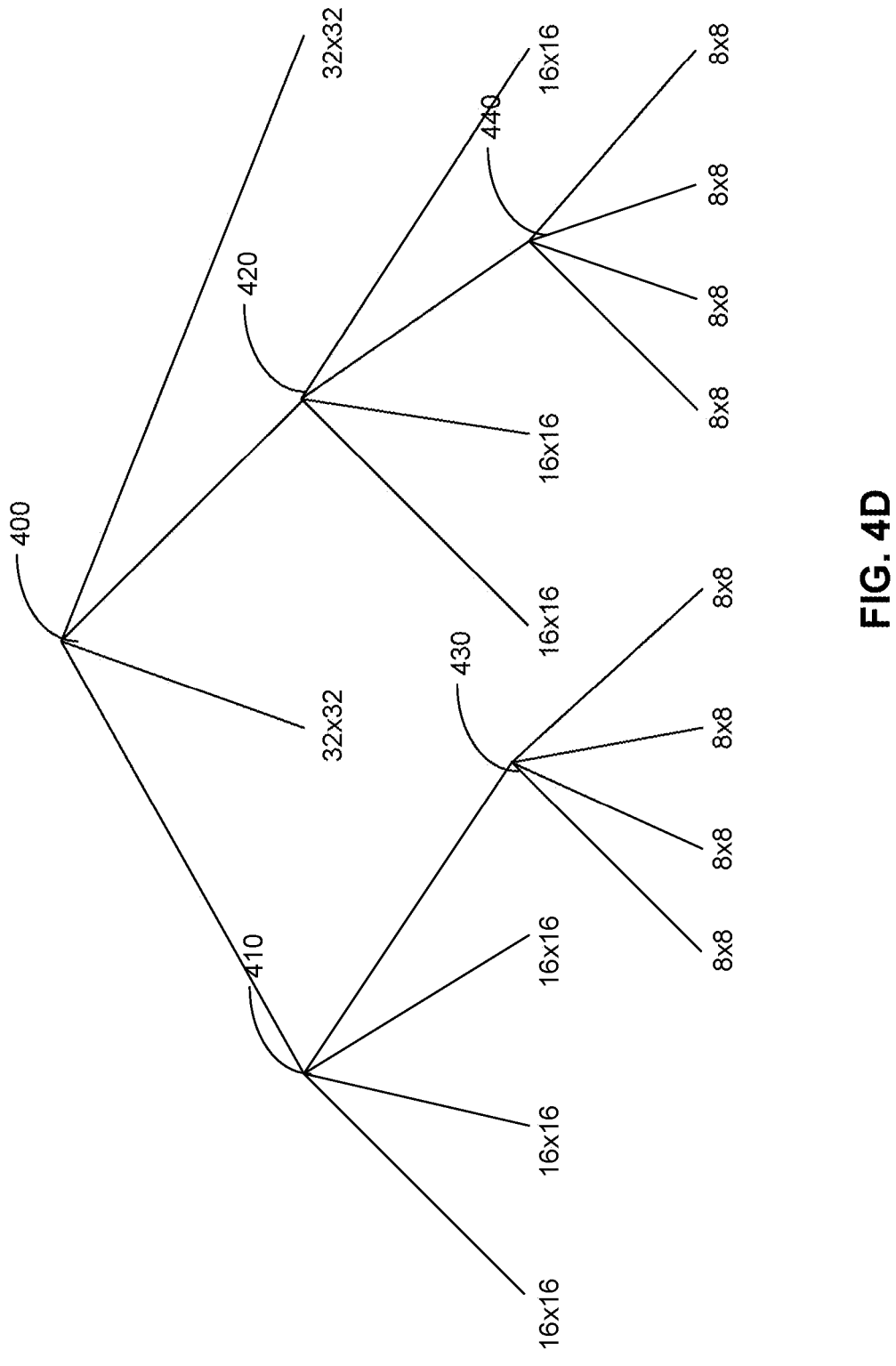

To achieve a better performance, video encoder 20 may recursively perform tree partitioning such as binary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever-improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally collocated CUs as an approximation of the motion information (e.g., motion vector) of a current CU by exploring their spatial and temporal correlation, which is also referred to as "motion vector predictor" (MVP) of the current CU.

Instead of encoding, into the video bitstream, an actual motion vector of the current CU determined by motion estimation unit 42 as described above in connection with FIG. 2, the motion vector predictor of the current CU is subtracted from the actual motion vector of the current CU to produce a motion vector difference (MVD) for the current CU. By doing so, there is no need to encode the motion vector determined by motion estimation unit 42 for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both video encoder 20 and video decoder 30 for constructing a motion vector candidate list (also known as a "merge list") for a current CU using those potential candidate motion vectors associated with spatially neighboring CUs and/or temporally collocated CUs of the current CU and then selecting one member from the motion vector candidate list as a motion vector predictor for the current CU. By doing so, there is no need to transmit the motion vector candidate list itself between video encoder 20 and video decoder 30 and an index of the selected motion vector predictor within the motion vector candidate list is sufficient for video encoder 20 and video decoder 30 to use the same motion vector predictor within the motion vector candidate list for encoding and decoding the current CU.

In some implementations, each inter-prediction CU has three motion vector prediction modes including inter (which is also referred to as "advanced motion vector prediction" (AMVP)), skip, and merge for constructing the motion vector candidate list. Under each mode, one or more motion vector candidates may be added to the motion vector candidate list according to the algorithms described below. Ultimately one of them in the candidate list is used as the best motion vector predictor of the inter-prediction CU to be encoded into the video bitstream by video encoder 20 or decoded from the video bitstream by video decoder 30. To find the best motion vector predictor from the candidate list, a motion vector competition (MVC) scheme is introduced to select a motion vector from a given candidate set of motion vectors, i.e., the motion vector candidate list, that includes spatial and temporal motion vector candidates.

In addition to deriving motion vector predictor candidates from spatially neighboring or temporally collocated CUs, the motion vector predictor candidates can also be derived from the so-called "history-based motion vector prediction" (HMVP) table. The HMVP table houses a predefined number of motion vector predictors, each having been used for encoding/decoding a particular CU of the same row of CTUs (or sometimes the same CTU). Because of the spatial/temporal proximity of these CUs, there is a high likelihood that one of the motion vector predictors in the HMVP table may be reused for encoding/decoding different CUs within the same row of CTUs. Therefore, it is possible to achieve a higher code efficiency by including the HMVP table in the process of constructing the motion vector candidate list.

In some implementations, the HMVP table has a fixed length (e.g., 5) and is managed in a quasi-First-In-First-Out (FIFO) manner. For example, a motion vector is reconstructed for a CU when decoding one inter-coded block of the CU. The HMVP table is updated on-the-fly with the reconstructed motion vector because such motion vector could be the motion vector predictor of a subsequent CU. When updating the HMVP table, there are two scenarios: (i) the reconstructed motion vector is different from other existing motion vectors in the HMVP table or (ii) the reconstructed motion vector is the same as one of the existing motion vectors in the HMVP table. For the first scenario, the reconstructed motion vector is added to the HMVP table as the newest one if the HMVP table is not full. If the HMVP table is already full, the oldest motion vector in the HMVP table needs to be removed from the HMVP table first before the reconstructed motion vector is added as the newest one. In other words, the HMVP table in this case is similar to a FIFO buffer such that the motion information located at the head of the FIFO buffer and associated with another previously inter-coded block is shifted out of the buffer so that the reconstructed motion vector is appended to the tail of the FIFO buffer as the newest member in the HMVP table. For the second scenario, the existing motion vector in the HMVP table that is substantially identical to the reconstructed motion vector is removed from the HMVP table before the reconstructed motion vector is added to the HMVP table as the newest one. If the HMVP table is also maintained in the form of a FIFO buffer, the motion vector predictors after the identical motion vector in the HMVP table are shifted forward by one element to occupy the space left by the removed motion vector and the reconstructed motion vector is then appended to the tail of the FIFO buffer as the newest member in the HMVP table.

The motion vectors in the HMVP table could be added to the motion vector candidate lists under different prediction modes such as AMVP, merge, skip, etc. It has been found that the motion information of previously inter-coded blocks stored in the HMVP table even not adjacent to the current block can be utilized for more efficient motion vector prediction.

After one MVP candidate is selected within the given candidate set of motion vectors for a current CU, video encoder 20 may generate one or more syntax elements for the corresponding MVP candidate and encode them into the video bitstream such that video decoder 30 can retrieve the MVP candidate from the video bitstream using the syntax elements. Depending on the specific mode used for constructing the motion vectors candidate set, different modes (e.g., AMVP, merge, skip, etc.) have different sets of syntax elements.

For the AMVP mode, the syntax elements include inter prediction indicators (List 0, List 1, or bi-directional prediction), reference indices, motion vector candidate indices, motion vector prediction residual signal, etc. For the skip mode and the merge mode, only merge indices are encoded into the bitstream because the current CU inherits the other syntax elements including the inter prediction indicators, reference indices, and motion vectors from a neighboring CU referred by the coded merge index. In the case of a skip coded CU, the motion vector prediction residual signal is also omitted.

Figure 5A:
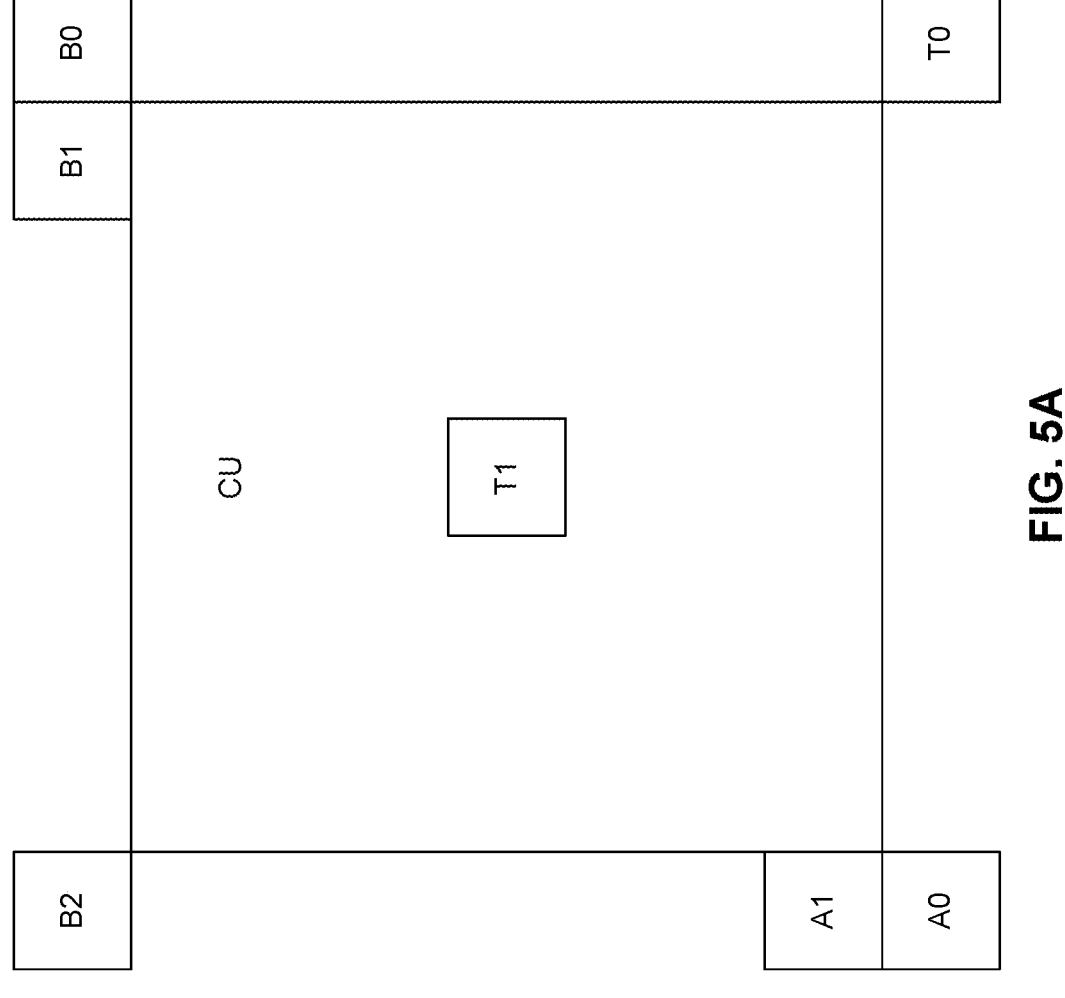
FIG. 5A is a block diagram illustrating spatially neighboring and temporally collocated block positions of a current CU to be encoded in accordance with some implementations of the present disclosure.

FIG. 5A is a block diagram illustrating spatially neighboring and temporally collocated block positions of a current CU to be encoded/decoded in accordance with some implementations of the present disclosure. For a given mode, a motion vector prediction (MVP) candidate list is constructed by first checking the availability of motion vectors associated with the spatially left and above neighboring block positions, and the availability of motion vectors associated with temporally collocated block positions and then the motion vectors in the HMVP table. During the process of constructing the MVP candidate list, some redundant MVP candidates are removed from the candidate list and, if necessary, zero-valued motion vector is added to make the candidate list to have a fixed length (note that different modes may have different fixed lengths). After the construction of the MVP candidate list, video encoder 20 can select the best motion vector predictor from the candidate list and encode the corresponding index indicating the chosen candidate into the video bitstream.

Using FIG. 5A as an example and assuming that the candidate list has a fixed length of two, the motion vector predictor (MVP) candidate list for the current CU may be constructed by performing the following steps in order under the AMVP mode:

1) Selection of MVP candidates from spatially neighboring CUs
        a) Derive up to one non-scaled MVP candidate from one of the two left spatial neighbour CUs starting with A0 and ending with A1;
        b) If no non-scaled MVP candidate from left is available in the previous step, derive up to one scaled MVP candidate from one of the two left spatial neighbour CUs starting with A0 and ending with A1;
        c) Derive up to one non-scaled MVP candidate from one of the three above spatial neighbour CUs starting with B0, then B1, and ending with B2;

d) If neither A0 nor A1 is available or if they are coded in intra modes, derive up to one scaled MVP candidate from one of the three above spatial neighbour CUs starting with B0, then B1, and ending with B2;

2) If two MVP candidates are found in the previous steps and they are identical, remove one of the two candidates from the MVP candidate list;

3) Selection of MVP candidates from temporally collocated CUs
   a) If the MVP candidate list after the previous step does not include two MVP candidates, derive up to one MVP candidate from the temporal collocated CUs (e.g., T0)

4) Selection of MVP candidates from the HMVP table
   a) If the MVP candidate list after the previous step does not include two MVP candidates, derive up to two history-based MVP from the HMVP table; and 5) If the MVP candidate list after the previous step does not include two MVP candidates, add up to two zero-valued MVPs to the MVP candidate list.

Since there are only two candidates in the AMVP-mode MVP candidate list constructed above, an associated syntax element like a binary flag is encoded into the bitstream to indicate that which of the two MVP candidates within the candidate list is used for decoding the current CU.

In some implementations, the MVP candidate list for the current CU under the skip or merge mode may be constructed by performing a similar set of steps in order like the ones above. It is noted that one special kind of merge candidate called "pair-wise merge candidate" is also included into the MVP candidate list for the skip or merge mode. The pair-wise merge candidate is generated by averaging the MVs of the two previously derived merge-mode motion vector candidates. The size of the merge MVP candidate list (e.g., from 1 to 6) is signaled in a slice header of the current CU. For each CU in the merge mode, an index of the best merge candidate is encoded using truncated unary binarization (TU). The first bin of the merge index is coded with context and bypass coding is used for other bins.

As mentioned above, the history-based MVPs can be added to either the AMVP-mode MVP candidate list or the merge MVP candidate list after the spatial MVP and temporal MVP. The motion information of a previously inter-coded CU is stored in the HMVP table and used as a MVP candidate for the current CU. The HMVP table is maintained during the encoding/decoding process. Whenever there is a non-sub-block inter-coded CU, the associated motion vector information is added to the last entry of the HMVP table as a new candidate while the motion vector information stored in the first entry of the HMVP table is removed from therein (if the HMVP table is already full and there is no identical duplicate of the associated motion vector information in the table). Alternatively, the identical duplicate of the associated motion vector information is removed from the table before the associated motion vector information is added to the last entry of the HMVP table.

As noted above, intra block copy (IBC) can significantly improve the coding efficiency of screen content materials. Since IBC mode is implemented as a block-level coding mode, block matching (BM) is performed at video encoder 20 to find an optimal block vector for each CU. Here, a block vector is used to indicate the displacement from the current block to a reference block, which has already been reconstructed within the current picture. An IBC-coded CU is treated as the third prediction mode other than the intra or inter prediction modes.

At the CU level, the IBC mode can be signaled as IBC AMVP mode or IBC skip/merge mode as follows:
IBC AMVP mode: a block vector difference (BVD) between the actual block vector of a CU and a block vector predictor of the CU selected from block vector candidates of the CU is encoded in the same way as a motion vector difference is encoded under the AMVP mode described above. The block vector prediction method uses two block vector candidates as predictors, one from left neighbor and the other one from above neighbor (if IBC coded). When either neighbor is not available, a default block vector will be used as a block vector predictor. A binary flag is signaled to indicate the block vector predictor index. The IBC AMVP candidate list consists of spatial and HMVP candidates.
IBC skip/merge mode: a merge candidate index is used to indicate which of the block vector candidates in the merge candidate list (also known as a "merge list") from neighboring IBC coded blocks is used to predict the block vector for the current block. The IBC merge candidate list consists of spatial, HMVP, and pairwise candidates.

Another approach of improving the coding efficiency adopted by the state-of-art coding standard is to introduce the parallel processing to the video encoding/decoding process using, e.g., a multi-core processor. For example, wavefront parallel processing (WPP) has already been introduced into HEVC as a feature of encoding or decoding of multiple rows CTUs in parallel using multiple threads.

Figure 5B:
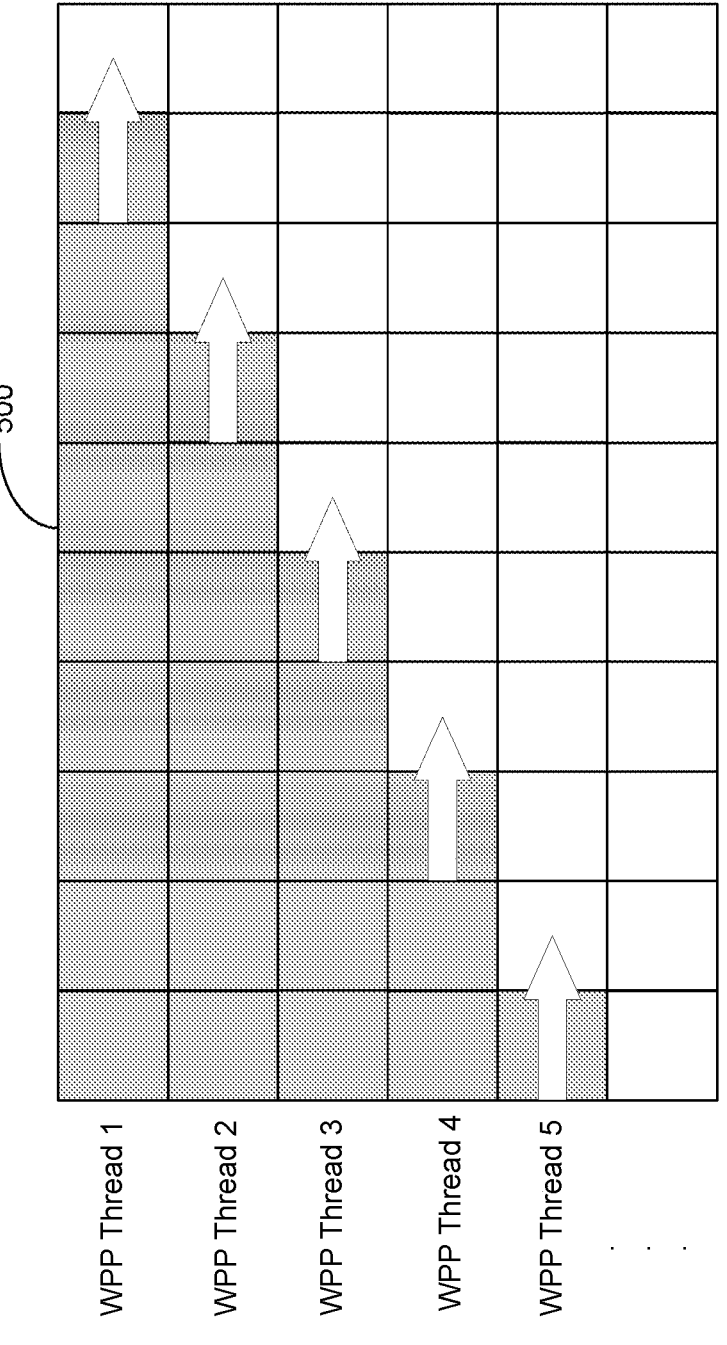
FIG. 5B is a block diagram illustrating multi-threaded encoding of multiple rows of CTUs of a picture using wavefront parallel processing in accordance with some implementations of the present disclosure.

FIG. 5B is a block diagram illustrating multi-threaded encoding of multiple rows of CTUs of a picture using wavefront parallel processing (WPP) in accordance with some implementations of the present disclosure. When WPP is enabled, it is possible to process multiple rows of CTUs in parallel in a wavefront fashion, where there may be a delay of two CTUs between the start of two neighboring wavefronts. For example, to code the picture 500 using WPP, a video coder, such as video encoder 20 and video decoder 30, may divide the coding tree units (CTUs) of the picture 500 into a plurality of wavefronts, each wavefront corresponding to a respective row of CTUs in the picture. The video coder may start coding a top wavefront, e.g., using a first coder core or thread. After the video coder has coded two or more CTUs of the top wavefront, the video coder may start coding a second-to-top wavefront in parallel with coding the top wavefront, e.g., using a second, parallel coder core or thread. After the video coder has coded two or more CTUs of the second-to-top wavefront, the video coder may start coding a third-to-top wavefront in parallel with coding the higher wavefronts, e.g., using a third, parallel coder core or thread. This pattern may continue down the wavefronts in the picture 500. In the present disclosure, a set of CTUs that a video coder is concurrently coding, using WPP, is referred to as a "CTU group." Thus, when the video coder uses WPP to code a picture, each CTU of the CTU group may belong to a unique wavefront of the picture and the CTU may be offset from a CTU in a respective, above wavefront by at least two columns of CTUs of the picture.

The video coder may initialize a context for a current wavefront for performing context adaptive binary arithmetic coding (CABAC) of the current wavefront based on data of the first two blocks of the above wavefront, as well as one or more elements of a slice header for a slice including the first code block of the current wavefront. The video coder may perform CABAC initialization of a subsequent wavefront (or CTU row) using the context states after coding two CTUs of a CTU row above the subsequent CTU row. In other words, before beginning coding of a current wavefront, a video coder (or more specifically, a thread of the video coder) may code at least two blocks of a wavefront above the current wavefront, assuming the current wavefront is not the top row of CTUs of a picture. The video coder may then initialize a CABAC context for the current wavefront after coding at least two blocks of a wavefront above the current wavefront. In this example, each CTU row of the picture 500 is a separated partition and has an associated thread (WPP Thread 1, WPP Thread 2, . . . ) such that the number of CTU rows in the picture 500 can be encoded in parallel.

Because the current implementation of the HMVP table uses a global motion vector (MV) buffer to store previously reconstructed motion vectors, this HMVP table cannot be implemented on the WPP-enabled parallel encoding scheme described above in connection with FIG. 5B. In particular, the fact that the global MV buffer is shared by all the threads of the encoding/decoding process of a video coder prevents the WPP threads after the first WPP thread (i.e., WPP Thread 1) from being started since these WPP threads have to wait for the HMVP table update from the last CTU (i.e., rightmost CTU) of the first WPP thread (i.e., the first CTU row) to be completed.

To overcome the problem, it is proposed that the global MV buffer shared by the WPP threads be replaced with multiple CTU row-dedicated buffers such that each wavefront of CTU row has its own buffer for storing an HMVP table corresponding to the CTU row being processed by a corresponding WPP thread when WPP is enabled at the video coder. It is noted that each CTU row having its own HMVP table is equivalent to resetting the HMVP table before coding a first CU of the CTU row. The HMVP table reset is to flush out all the motion vectors in the HMVP table resulting from coding of another CTU row. In one implementation, the reset operation is to set the size of the available motion vector predictors in the HMVP table to be zero. In yet another implementation, the reset operations could be to set the reference index of all the entries in the HMVP table to be an invalid value such as −1. By doing so, the construction of MVP candidate list for a current CTU within a particular wavefront, regardless of which one of the three modes, AMVP, merge, and skip, is dependent upon an HMVP table associated with a WPP thread processing the particular wavefront.

There is no inter-dependency between different wavefronts other than the two-CTU delay described above and the construction of motion vector candidate lists associated with different wavefronts can proceed in parallel like the WPP process depicted in FIG. 5B. In other words, at the beginning of processing a particular wavefront, the HMVP table is reset to be empty without affecting the coding of another wavefront of CTUs by another WPP thread. In some cases, the HMVP table can be reset to be empty before the coding of each individual CTU. In this case, the motion vectors in the HMVP table are limited to a particular CTU and there is probably a higher chance of a motion vector within the HMVP table being selected as a motion vector of a current CU within the particular CTU.

Figure 6A:
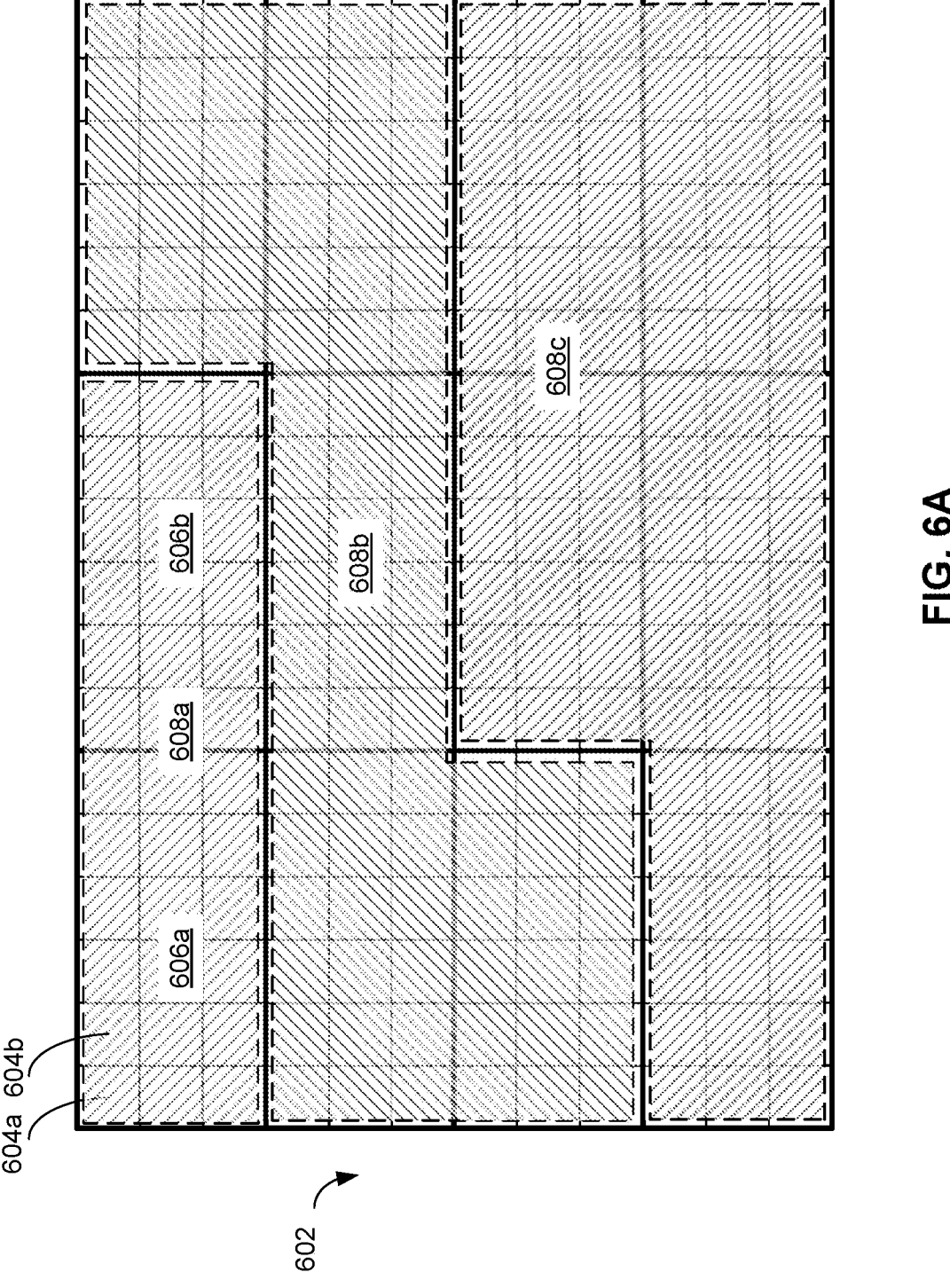
FIGS. 6A-6B are block diagrams illustrating exemplary video frame partitioning schemes in accordance with some implementations of the present disclosure.
Figure 6B:
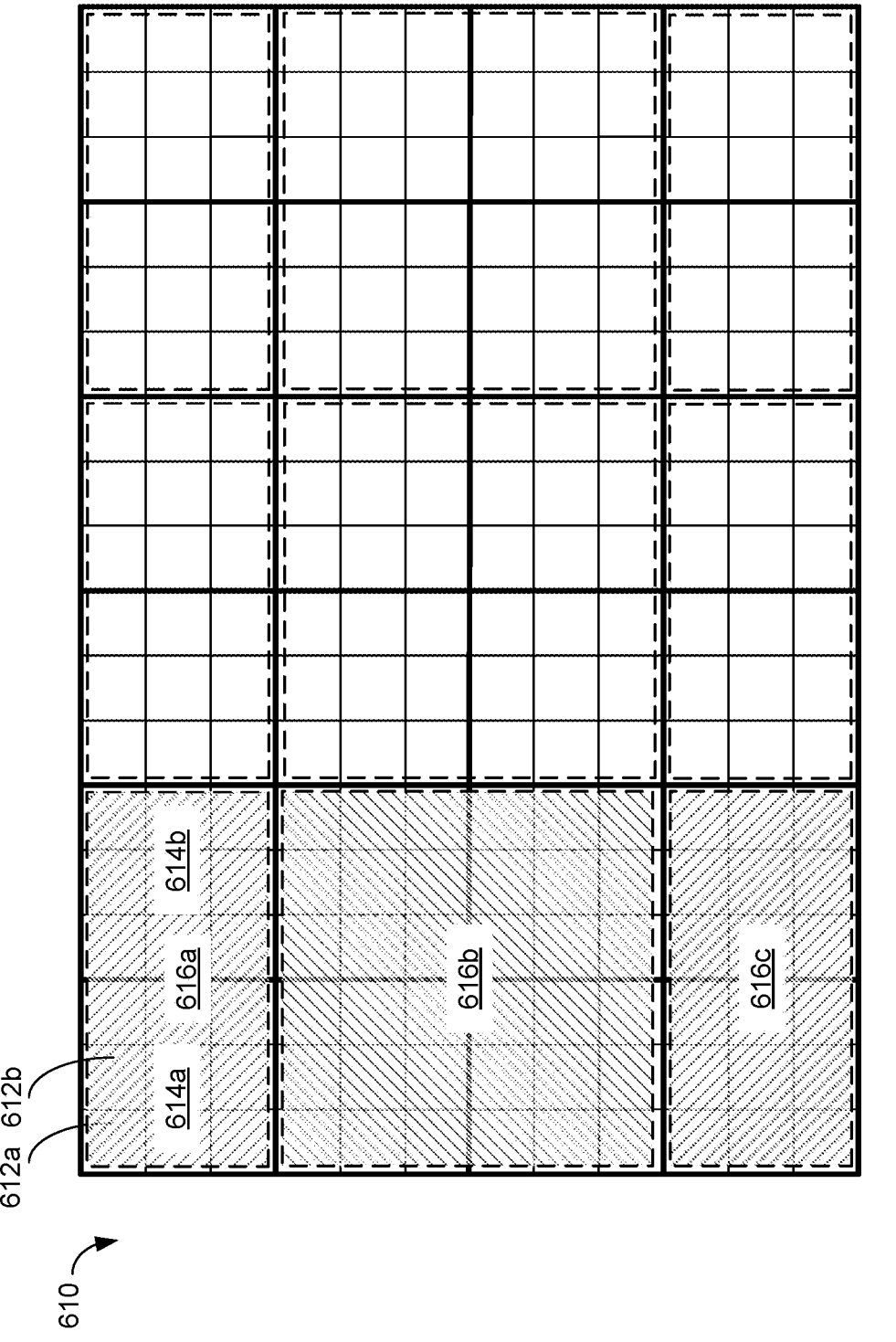

FIGS. 6A and 6B are block diagrams illustrating exemplary video frame partitioning schemes in accordance with some implementations of the present disclosure.

FIG. 6A shows an exemplary raster-scan slice partitioning of video frame 602 (e.g., raster-scan slice mode). Video frame 602 is a rectangular region including 12×18 CTUs (e.g., CTU 604a, CTU 604b, etc.) and is partitioned into three slices (e.g., slice 608a, 608b, and 608c in FIG. 6A with different filling patterns). A slice in a raster-scan slice partitioning is a set of continuous tiles (e.g., in the raster-scan order) in a video frame. For example, slice 608a includes two tile 606a and tile 606b, slice 608b includes five continuous tiles of video frame 602 in raster-scan order, and slice 608c includes another five tiles of video frame 602 in raster-scan order. Each tile is a rectangular region of CTUs. As such, video frame 602 includes twelve tiles each including 3×6 CTUs.

FIG. 6B shows an exemplary rectangular slice partitioning of video frame 610 (e.g., rectangular slice mode). Video frame 610 is a rectangular region including 12×18 CTUs (e.g., CTU 612a, 612b, etc.) and is partitioned into nine slices (e.g., slice 616a, 616b, 616c, etc. in FIG. 6B with different filling patterns). Unlike the raster-scan slice partitioning shown in FIG. 6A, slices (e.g., slice 616a, 616b, 616c) in video frame 610 are each a rectangular region including a plurality of tiles. For example, slice 616a is a rectangular region including two tiles (tiles 614a and 614b), and slice 616b is a square region including four tiles. In some embodiments, the tiles within each slice are arranged in raster-scan order.

Video frame 610 includes twenty-four tiles (e.g., tile 614a, tile 614b, etc.) of equal size, with each tile including 3×3 CTUs.

In some embodiments, a slice consists of an integer number of complete tiles or an integer number of consecutive complete CTU rows within a tile of a picture.

Consequently, each vertical slice boundary is always also a vertical tile boundary. It is possible that a horizontal boundary of a slice is not a tile boundary but consists of horizontal CTU boundaries within a tile; this occurs when a tile is split into multiple rectangular slices, each of which consists of an integer number of consecutive complete CTU rows within the tile.

Two modes of slices are supported, namely the raster-scan slice mode (e.g., illustrated in FIG. 6A) and the rectangular slice mode (e.g., illustrated in FIG. 6B). In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

Therefore, in either raster-scan slice partitioning or rectangular slice partitioning, a video frame is partitioned in a nested manner at different levels. For example, a video frame may be partitioned as a plurality of slices, a plurality of tiles within each slice, and a plurality of CTUs within each tile. In some embodiments, each partition is associated with a parameter set including instructions for coding the corresponding partition. For example, the video sequence including video frame 602 (or video frame 610) may be associated with a sequence parameter set (SPS), and each video frame 602 (or video frame 610) may be further associated with a picture parameter set (PPS). Each of the slice (e.g., slice 608a or slice 616a) may be associated with a respective slice parameter set (e.g., within slice header), and each of the tiles (e.g., tile 606a or tile 614a) may be associated with a respective tile parameter set (e.g., within the tile header), each of the CTUs (e.g., CTU 604a or CTU 612a) may be associated with a respective CTU parameter set (CTU header), and each of the CUS may be associated with a respective CU parameter set (CU header). The respective parameter set for a partition may include information for coding the respective partition in (i) a lossy mode or (ii) a lossless mode (in which operations such as transform/inverse-transform, quantization/de-quantization, and in-loop filtering are being skipped).

Traditionally (e.g., in HEVC), lossless coding is enabled by a two-flag system A first flag (e.g., "transquant_bypass_enabled_flag") is signaled only at a video frame level (e.g., included in the PPS associated with the video frame) to indicate whether lossless mode is enabled in the video frame, and a second flag (e.g., "cu_transquant_bypass_flag") is signaled only at a CU level to indicate whether a respective CU is coded in lossless or lossy mode. For example, if transquant_bypass_enabled_flag is set to a Boolean value "1" for a video frame, then a lossless mode is enabled for the video frame and further signaling by the second flag at CU levels is needed. On the other hand, if transquant_bypass_enabled_flag is set to a Boolean value "0" for the video frame, then a lossless mode is not enabled and further signaling by the second flag at CU levels is not needed (e.g., all CUs in the video frame are coded in lossy mode). In other words, the first flag, transquant_bypass_enabled_flag, is used to turn on the syntax signaling of the second flag, cu_transquant_bypass_flag. In the case where transquant_bypass_enabled_flag is set to "1" for the video frame, cu_transquant_bypass_flag is required to be signaled for each CU of the video frame to indicate if the respective CU is coded in lossless mode (e.g., cu_transquant_bypass_flag set to "1") or lossy mode (e.g., cu_transquant_bypass_flag set to "0"). In lossless mode, transform/inverse transform, quantization/de-quantization, and in-loop filtering processes are skipped for the respective CUs and the prediction residual values are directly coded by the entropy coding module.

Such a two-flag signaling mechanism provides greater control granularity for enabling the lossless mode in video coding, but incurs excessive signaling overhead. For example, if the entire video frame is to be coded in lossless mode (e.g., in applications that require transferring high definition images such as telemedicine) with the transquant_bypass_enabled_flag set to "1", a cu_transquant_bypass_flag has to be signaled for every CU in that video frame, causing excessive signaling overhead. Furthermore, the two-flag signaling mechanism is unduly rigid as the flags can only be set at the two predefined partition levels (e.g., video frame level and CTU level). Therefore, a more flexible signaling mechanism to indicate coding mode (e.g., lossless or lossy) at any partition levels (e.g., video sequence level, video frame level, slice level, tile level, CTU level, or CU level) is highly desired.

In some embodiments, a first syntax element may be signaled at any partition levels (e.g., video sequence level, video frame level, slice level, tile level, CTU level, or CU level) to turn on syntax signaling of lossless or lossy mode. If the first syntax element is set to "0" at a first partition level, then all CUs within or below the first partition level are coded in lossy mode (e.g., a respective second syntax element for each CU at and below the first partition level is implicitly interpreted to "0" to indicate lossy mode is used). For example, if the first syntax element is set to "0" in the slice header of slice 616a of FIG. 6B, then all CTUs within slice 616a (e.g., CTU 612a, CTU 612b, etc.) are coded in lossy mode (e.g., further signaling of a respective second syntax element for each CU within slice 616a is no longer needed). On the other hand, if the first syntax element is set to "1" in the slice header of slice 616a of FIG. 6B, then all CTUs within or below the first partition level may be coded in either lossless or lossy mode and further signaling by respective second syntax elements is needed. For example, if the first syntax element is set to "1" in the slice header of slice 616a of FIG. 6B, further syntax signaling by a respective second syntax element is needed at a lower level such as the tile level. If a respective second syntax element for tile 614a is set to "0", then all the nine CTUs within tile 614a are coded in lossy mode. If a respective second syntax element for tile 614b is set to "1", then further signaling by a respective third syntax element is needed for each CTU within tile 614b. Therefore, syntax signaling can be performed in a cascading manner, and a lower level syntax signaling is dependent on a higher level syntax signaling.

In the embodiment described above, a lossy mode is signaled in a bit-saving manner (e.g., a syntax element "0" at a partition level would cause all lower partition levels to be coded in lossy mode, and no further syntax signaling is needed). In some alternative embodiments, lossless mode, instead of lossy mode, is implicitly signaled based on signaling of lossless mode at a higher partition level. For example, if the first syntax element is set to "1" in the PPS of video frame 610, then all CTUs within the video frame 610 are coded using lossless mode and further signaling by second syntax elements is no longer needed. If the first syntax element is set to "0" in the PPS of video frame 610 (e.g., indicating that not all CUs in video frame 610 are coded in lossless mode), then further signaling by second syntax elements at lower slice levels are needed. The further signaling (e.g., by second, third, fourth, etc. syntax elements) at lower partition levels can be performed in a cascading manner. For example, if the second syntax element is set to "0" in the slice header for slice 616a, then further syntax signaling for all tiles (e.g., tile 614a and tile 614b) within slice 616a is needed (e.g., by respective third syntax elements, which can indicate either lossless mode or lossy mode). If the second syntax element is set to "1" in the slice header for slice 616a, then no further syntax signaling is needed at any partition level within slice 616a, and all CTUs within slice 616a are in a lossless mode.

FIG. 7 is a flowchart illustrating an exemplary process 700 by which a video coder (e.g., video decoder 30 of FIG. 3) implements the techniques of enabling lossless coding in accordance with some implementations of the present disclosure. In some embodiments, the video coder performs lossless coding by skipping transformation (e.g., the operation performed by inverse transform processing unit 88 of FIG. 3), quantization (e.g., the operation performed by inverse quantization unit 86 of FIG. 3), and in-loop filters (de-block filter, sample adaptive offset, adaptive loop filter, etc.) during a video coding process. As a result, prediction residual values are directly coded by an entropy coding module (e.g., entropy decoding unit 80 of FIG. 3). For convenience, the process 700 is described as being performed by a video coder (e.g., video decoder 30 of FIG. 3).

In the first step, the video coder receives a bitstream (e.g., on destination device 14 of FIG. 1) corresponding to video data encoding one or more pictures (e.g., a video) (710). For example, the one or more pictures may be one video frame or a video sequence and are to be reconstructed by the video coder on the destination device. In some embodiments, the one or more pictures are recursively partitioned into a plurality of group at different partition levels (720). For example, the one or more pictures may have been divided into a plurality of slices (e.g., slices 608a-608c of FIG. 6A), and each slice may have been further divided into a plurality of tiles (e.g., tile 606a and 606b within slice 608a of FIG. 6A), and each tile may have been divided into a plurality of CTUs (e.g., CTU 604a and 604b within tile 606a of FIG.

6A), and each CTU may have been divided into a plurality of CUs. In such an example, the first partition level corresponds to a video sequence level, the second partition level corresponds to a picture level (one or more pictures within the video sequence), the third partition level corresponds to a slice level, a fourth partition level corresponds to a tile level, a fifth partition level corresponds to a CTU level, and a sixth partition level corresponds to a CU level.

The video coder then determines a first syntax element that corresponds to a first group of the plurality of groups (730), wherein the first group is at a first partition level (740). For example, the first group corresponds to the entire video sequence and the first partition level corresponds to the video sequence level. The first syntax element may be a Boolean variable and is stored in the sequence parameter set (SPS) of the one or more pictures in the bitstream. In another example, the first group corresponds to a subset of pictures in the video sequence and the first syntax element is stored in the picture parameter set (PPS) of the subset of pictures.

If the video coder determines that the first syntax element has a first value (e.g., "1") (750), then the video coder decodes the first group in a first mode (760). In some embodiments, the first mode is a lossless mode. Alternatively, the first mode is a lossy mode. Decoding the first group in a lossless/lossy mode means decoding all sub-units (e.g., all CUs) within the first unit in a lossless/lossy mode. For example, the video coder may decode all the CUs in the first unit without performing the inverse-transformation, de-quantization, or in-loop filtering. As a result, prediction residual values are directly decoded by an entropy decoding unit of the video coder (e.g., entropy decoding unit 80 of FIG. 3). Therefore, the first syntax element having the first value indicates that all units within the first unit (e.g., all CUs) are to be decoded in a lossless/lossy mode.

If the video coder determines that the first syntax element has a second value (e.g., "0") (770), then the video coder further determines a respective second syntax element for each of one or more second groups within the first group (780). The one or more second groups are at a second partition level below the first partition level (790). For example, if the first group corresponds to the one or more pictures (the video sequence), then the one or more second units may correspond to a subset of pictures within the video sequence, and the respective second syntax element may be a Boolean variable stored in the respective picture parameter set (PPS) of the subset of pictures. In another example, if the first group corresponds to a slice, then the one or more second group may correspond to one or more tiles within the slice, and the respective second syntax element may be a Boolean variable stored in the respective tile header of the one or more tiles. The video coder then decodes each of the one or more second units in accordance with a value of the respective second syntax element (795). In some embodiments, the second group may be at a partition level immediately below that of the first group (e.g., the first group is a video sequence and the second group is a subset of pictures within the video sequence, or the first group is a slice and the second group is a tile, etc.). Alternatively, the second group may be at a partition level a few levels below that of the first group (e.g., the first group is a video sequence and the second group is a slice, or the first group is a video sequence and the second group is a CTU, etc.).

In some embodiments, when the first syntax element has the second value, the video coder decodes each of the one or more second groups in accordance with the value of the respective second syntax element in the following manner: in accordance with a determination that the respective second syntax element has the first value: decodes the respective second group in the first mode; and in accordance with a determination that the respective second syntax element has the second value: decodes the respective second group in the second mode. For example, if the first mode is the lossless mode, the second mode then is the lossy mode. Alternatively, if the first mode is the lossy mode, then the second mode is the lossless mode.

In some embodiments, when the first syntax element has the second value, the video coder decodes each of the one or more second groups in accordance with the value of the respective second syntax element in the following manner: in accordance with a determination that the respective second syntax element has the first value: decodes the respective second group in the first mode; and in accordance with a determination that the respective second syntax element has the second value: determines a respective third syntax element for each of one or more third groups within the respective second group, wherein the one or more third groups are at a third partition level below the second partition level; and decodes each of the one or more third groups in accordance with a value of the respective third syntax element.

In some embodiments, when the respective second syntax element has the second value, the video coder decodes each of the one or more third groups in accordance with the value of the respective third syntax element in the following manner: in accordance with a determination that the respective third syntax element has the first value: decodes the respective third group in the first mode; and in accordance with a determination that the respective third syntax element has the second value: decodes the respective third group in the second mode.

In some embodiments, when the respective second syntax element has the second value, the video coder decodes each of the one or more third groups in accordance with the value of the respective third syntax element in the following manner: in accordance with a determination that the respective third syntax element has the first value: decodes the respective third group in the first mode; and in accordance with a determination that the respective third syntax element has the second value: determines a respective fourth syntax element for each of one or more fourth groups within a the respective third group, wherein the one or more fourth units groups are at a fourth partition level below the third partition level; and decodes each of the one or more fourth groups in accordance with a value of the respective fourth syntax element.

In some embodiments, when the respective third syntax element has the second value, the video coder decodes each of the one or more fourth groups in accordance with the value of the respective fourth syntax element in the following manner: in accordance with a determination that the respective fourth syntax element has the first value: decodes the respective fourth group in the first mode; and in accordance with a determination that the respective fourth syntax element has the second value: decodes the respective fourth group in the second mode.

In some embodiments, when the respective third syntax element has the second value, the video coder decodes each of the one or more fourth groups in accordance with the value of the respective fourth syntax element in the following manner: in accordance with a determination that the respective fourth syntax element has the first value: decodes the respective fourth group in the first mode; and in accordance with a determination that the respective fourth syntax element has the second value: determines a respective fifth syntax element for each of one or more fifth groups within the respective fourth group, wherein the one or more fifth groups are at a fifth partition level below the fourth partition level; and decodes each of the one or more fifth groups in accordance with a value of the respective fifth syntax element.

In some embodiments, when the respective fourth syntax element has the second value, the video coder decodes each of the one or more fifth groups within the respective fourth group in accordance with the value of the respective fifth syntax element in the following manner: in accordance with a determination that the respective fifth syntax element has the first value: decodes the respective fifth group in the first mode; and in accordance with a determination that the respective fifth syntax element has the second value: decodes the respective fifth group in the second mode.

In some embodiments, when the respective fourth syntax element has the second value, the video coder decodes each of the one or more fifth groups within the respective fourth group in accordance with the value of the respective fifth syntax element in the following manner: in accordance with a determination that the respective fifth syntax element has the first value: decodes the respective fifth group in the first mode; and in accordance with a determination that the respective fifth syntax element has the second value: determines a respective sixth syntax element for each of one or more sixth groups within the respective fifth group, wherein the one or more sixth groups are at a sixth partition level below the fifth partition level; and decodes each of the one or more sixth groups in accordance with a value of the respective sixth syntax element.

In some embodiments, when the respective fifth syntax element has the second value, the video coder decodes each of the one or more sixth groups within the respective fifth group in accordance with the value of the respective sixth syntax element in the following manner: in accordance with a determination that the respective sixth syntax element has the first value: decodes the respective sixth group in the first mode; and in accordance with a determination that the respective sixth syntax element has the second value: decodes the respective sixth group in the second mode.

In some embodiments, the first mode is a lossless mode and the second mode is a lossy mode. Alternatively, the first mode is a lossy mode and the second mode is a lossless mode.

In some embodiments, the first group corresponds to the one or more pictures, a subset of the one or more pictures, a slice in the one or more pictures, a tile in the one or more pictures, or a coding tree unit (CTU) in the one or more pictures, and wherein the first syntax element is stored in a sequence parameter set (SPS), a picture parameter set (PPS), a slice header, a tile header, or a CTU header, respectively.

In some embodiments, the respective second group corresponds to a respective subset of the one or more pictures, a respective slice in the one or more pictures, a respective tile in the one or more pictures, a respective CTU in the one or more pictures, or a respective coding unit (CU) of the one or more pictures, and wherein the second syntax element is stored in a respective PPS, a respective slice header, a respective tile header, a respective CTU header, or a respective CU header, respectively.

In some embodiments, the respective third group corresponds to a respective slice in the one or more pictures, a respective tile in the one or more pictures, a respective CTU in the one or more pictures, or a respective CU in the one or more pictures, and wherein the third syntax element is stored in a respective slice header, a respective tile header, a respective CTU header, or a respective CU header, respectively.

In some embodiments, the respective fourth group corresponds to a respective tile of the one or more pictures, a respective CTU in the one or more pictures, or a respective CU in the one or more pictures, and wherein the fourth syntax element is stored in a respective tile header, a respective CTU header, or a respective CU header, respectively.

In some embodiments, the respective fifth group corresponds to a respective CTU in the one or more pictures, or a respective CU in the one or more pictures, and wherein the fifth syntax element is stored in a respective CTU header or a respective CU header, respectively.

In some embodiments, the respective sixth group corresponds to a respective CU in the one or more pictures, and wherein the sixth syntax element is stored in a respective CU header.

In some embodiments, when a syntax element corresponding to a group of a partition level has the first value, no other syntax elements corresponding to groups of partition levels below the partition level are signaled in the bitstream.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates the transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

The invention claimed is:

1. A method of video encoding, comprising:

partitioning one or more pictures into a plurality of groups at different partition levels, wherein the plurality of groups comprising a first group, the first group is at a first partition level;

setting a first syntax element that corresponds to the first group as having a first value, to indicate that a first mode is to be used for decoding the first group or setting the first syntax element as having a second value, to indicate that a respective second syntax element is to be signaled for each of one or more second groups within the first group, wherein the one or more second groups are at a second partition level below the first partition level; and signaling, in a bitstream corresponding to video data encoding the one or more pictures, the first syntax element and/or the second syntax element, wherein the method further comprises, in a case that the respective second syntax element is signaled:

setting the respective second syntax element as having the first value, to indicate that the first mode is to be used for decoding the respective second group; or setting the respective second syntax element as having the second value.

2. The method of claim 1, wherein the respective second syntax element is set as having the second value to indicate that:

a second mode is to be used for decoding the respective second group; or a respective third syntax element is to be signaled for each of one or more third groups within the respective second group, wherein the one or more third groups are at a third partition level below the second partition level.

3. The method of claim 2, further comprising, in a case that the respective third syntax element is signaled:

setting the respective third syntax element as having the first value, to indicate that the first mode is to be used for decoding the respective third group; or setting the respective third syntax element as having the second value, to indicate that the second mode is to be used for decoding the respective third group.

4. The method of claim 2, further comprising, in a case that the respective third syntax element is signaled:

setting the respective third syntax element as having the first value, to indicate that the first mode is to be used for decoding the respective third group; or setting the respective third syntax element as having the second value, to indicate that a respective fourth syntax element is to be signaled for each of one or more fourth groups within the respective third group, wherein the one or more fourth groups are at a fourth partition level below the third partition level.

5. The method of claim 4, further comprising, in a case that the respective fourth syntax element is signaled:

setting the respective fourth syntax element as having the first value, to indicate that the first mode is to be used for decoding the respective fourth group; or setting the respective fourth syntax element as having the second value, to indicate that the second mode is to be used for decoding the respective fourth group.

6. The method of claim 4, further comprising, in a case that the respective fourth syntax element is signaled:

setting the respective fourth syntax element as having the first value, to indicate that the first mode is to be used for decoding the respective fourth group; or setting the respective fourth syntax element as having the second value, to indicate that a respective fifth syntax element is to be signaled for each of one or more fifth groups within the respective fourth group, wherein the one or more fifth groups are at a fifth partition level below the fourth partition level.

7. The method of claim 6, further comprising, in a case that the respective fifth syntax element is signaled:

setting the respective fifth syntax element as having the first value, to indicate that the first mode is to be used for decoding the respective fifth group; or setting the respective fifth syntax element as having the second value, to indicate that the second mode is to be used for decoding the respective fifth group.

8. The method of claim 6, further comprising, in a case that the respective fifth syntax element is signaled:

setting the respective fifth syntax element as having the first value, to indicate that the first mode is to be used for decoding the respective fifth group; or setting the respective fifth syntax element as having the second value, to indicate that a respective sixth syntax element is to be signaled for each of one or more sixth groups within the respective fifth group, wherein the one or more sixth groups are at a sixth partition level below the fifth partition level.

9. The method of claim 8, further comprising, in a case that the respective sixth syntax element is signaled:

setting the respective sixth syntax element as having the first value, to indicate that the first mode is to be used for decoding the respective sixth group; or setting the respective sixth syntax element as having the second value, to indicate that the second mode is to be used for decoding the respective sixth group.

10. The method of claim 1, wherein the first mode is a lossless mode, and a second mode is a lossy mode; or the first mode is a lossy mode, and the second mode is a lossless mode.

11. The method of claim 1, wherein the first group corresponds to the one or more pictures, a subset of the one or more pictures, a slice in the one or more pictures, a tile in the one or more pictures, or a coding tree unit (CTU) in the one or more pictures, and wherein the first syntax element is stored in a sequence parameter set (SPS), a picture parameter set (PPS), a slice header, a tile header, or a CTU header, respectively.

12. The method of claim 1, wherein the respective second group corresponds to a respective subset of the one or more pictures, a respective slice in the one or more pictures, a respective tile in the one or more pictures, a respective CTU in the one or more pictures, or a respective coding unit (CU) of the one or more pictures, and wherein the second syntax element is stored in a respective PPS, a respective slice header, a respective tile header, a respective CTU header, or a respective CU header, respectively.

13. The method of claim 1, wherein a respective third group corresponds to a respective slice in the one or more pictures, a respective tile in the one or more pictures, a respective CTU in the one or more pictures, or a respective CU in the one or more pictures, and wherein a third syntax element is stored in a respective slice header, a respective tile header, a respective CTU header, or a respective CU header, respectively.

14. The method of claim 4, wherein the respective fourth group corresponds to a respective tile of the one or more pictures, a respective CTU in the one or more pictures, or a respective CU in the one or more pictures, and wherein the fourth syntax element is stored in a respective tile header, a respective CTU header, or a respective CU header, respectively.

15. The method of claim 6, wherein the respective fifth group corresponds to a respective CTU in the one or more pictures, or a respective CU in the one or more pictures, and wherein the fifth syntax element is stored in a respective CTU header or a respective CU header, respectively.

16. The method of claim 8, wherein the respective sixth group corresponds to a respective CU in the one or more pictures, and wherein the sixth syntax element is stored in a respective CU header.

17. The method of claim 1, wherein when a syntax element corresponding to a group of a partition level has the first value, no other syntax elements corresponding to groups of partition levels below the partition level are signaled in the bitstream.

18. A computing device, comprising:
one or more processors; and a memory configured to store instructions executable by the one or more processors, wherein the one or more processors, upon execution of the instructions, are configured to execute video encoding by being configured to:
  partition one or more pictures into a plurality of groups at different partition levels, wherein the plurality of groups comprising a first group, the first group is at a first partition level;

set a first syntax element that corresponds to the first group as having a first value, to indicate that a first mode is to be used for decoding the first group, or set the first syntax element as having a second value, to indicate that a respective second syntax element is to be signaled for each of one or more second groups within the first group, wherein the one or more second groups are at a second partition level below the first partition level; and signal, in a bitstream corresponding to video data encoding the one or more pictures, the first syntax element and/or the second syntax element, wherein the one or more processors are further configured to, in a case that the respective second syntax element is signaled:

set the respective second syntax element as having the first value, to indicate that the first mode is to be used for decoding the respective second group; or set the respective second syntax element as having the second value.

19. A method for storing a bitstream, comprising:
performing an encoding method to generate a bitstream; and
storing the bitstream,
wherein the encoding method comprises:
  partitioning one or more pictures into a plurality of groups at different partition levels, wherein the plurality of groups comprising a first group, the first group is at a first partition level;
  setting a first syntax element that corresponds to the first group as having a first value, to indicate that a first mode is to be used for decoding the first group or setting the first syntax element as having a second value, to indicate that a respective second syntax element is to be signaled for each of one or more second groups within the first group, wherein the one or more second groups are at a second partition level below the first partition level; and
  signaling, in a bitstream corresponding to video data encoding the one or more pictures, the first syntax element and/or the second syntax element,
wherein the encoding method further comprises, in a case that the respective second syntax element is signaled:
  setting the respective second syntax element as having the first value, to indicate that the first mode is to be used for decoding the respective second group; or
  setting the respective second syntax element as having the second value.

* * * * *